United States Patent [19]

Foggia et al.

[11] Patent Number: 4,634,889
[45] Date of Patent: Jan. 6, 1987

[54] ELECTRO-MECHANICAL CONVERTER WITH SEVERAL DEGREES OF FREEDOM

[75] Inventors: Albert A. Foggia, Lozanne; Jean-Claude Sabonnadiere, Meylan, both of France

[73] Assignee: L'Etat Francais, Paris, France

[21] Appl. No.: 558,980

[22] Filed: Dec. 7, 1983

[30] Foreign Application Priority Data

Dec. 7, 1982 [FR] France .................. 82 20450

[51] Int. Cl.$^4$ .............................................. H01F 27/06
[52] U.S. Cl. .................................... 307/104; 318/649; 343/75; 343/760; 343/766; 901/16; 901/23
[58] Field of Search ............... 307/104, 151; 318/649; 343/757, 758, 760, 765, 766; 901/16, 19, 23, 29

[56] References Cited

U.S. PATENT DOCUMENTS

| | | | |
|---|---|---|---|
| 3,398,341 | 8/1968 | Dooley et al. | 318/649 |
| 3,441,936 | 4/1969 | Heine | 343/765 X |
| 4,073,201 | 2/1978 | Taylor et al. | 901/29 X |
| 4,143,212 | 3/1979 | Duckworth et al. | 318/649 |
| 4,437,047 | 3/1984 | Smay | 318/649 |

FOREIGN PATENT DOCUMENTS 977623 11/1967 Fed. Rep. of Germany .
2325974 4/1977 France .

Primary Examiner—A. D. Pellinen
Assistant Examiner—Derek S. Jennings
Attorney, Agent, or Firm—Parkhurst & Oliff

[57] ABSTRACT

A device used as an electro-mechanical converter includes a body having a spherical outer surface, a structure peripherally surrounding the spherical body and electromagnetic means spatially located from the body to cause a rotational displacement of the body. The body is connected to a static support and all rotational motions are relative thereto.

23 Claims, 13 Drawing Figures

ELECTRO-MECHANICAL CONVERTER WITH SEVERAL DEGREES OF FREEDOM

BACKGROUND OF THE INVENTION

This invention pertains to the technical question of orienting, shifting or adjusting, on three degrees of freedom, a mobile body in relation to a static part or structure.

The purpose of the invention is especially the question of positioning any body in relation to a static reference and it especially involves adjusting the orientation of a body which must also be mobile under rotation on an axis that can adopt any orientation inside a pre-set solid angle.

The invention can be the subject of several different applications and it can be implemented, especially for robots, steerable structure controls, like radar, industry manipulators, guidance platform controls, etc.

In the various areas mentioned above, the issue of adjusting, orienting or shifting a mobile body, in relation to a static structure along several degrees of freedom, takes place by implementing an activator integral with each concerned clearance axis or degree. This leads to the formation of a heavy, cumbersome, onerous unit because of the large number of activators and their linkage control means.

Furthermore, such a concept leads to the creation of disadvantages resulting from the various implemented activators and especially questions of reliability, directly related to them.

Thus, patent FR No. 2 325 974 discloses a device having three degrees of freedom at the mechanical level, but only two degrees of electric motorizing with two pairs of poles which are diametrically opposed in the same horizontal plane.

Indeed, the three mechanical degrees of freedom cannot be controlled independently.

Patent DE No. 977 623 discloses a device that is analogous to the previous one but it incorporates an additional electric engine in order to supply a third degree of freedom. The third engine is mobile relative to the support since its inductor and its armature are mounted on a mobile apparatus, which constitutes a heavy device of which the mobile parts possess a high degree of inertia. Therefore it involves simply an engine with one degree of freedom of which the support is stabilized.

The purpose of the invention is to replace the various activators of the prior technique with a unique means that can overcome the aforementioned drawbacks while permitting motion for a mobile body relative to a static reference on three degrees of freedom, one of those degrees of freedom representing a complete rotating axis for the mobile body, and the movement of each degree of freedom can be achieved independently from the movements on the two other axes.

Another purpose of the invention is to achieve simultaneous or independent control on each or several of the degrees of freedom so as to trigger an ensuing motion which is directly related to the individual components pertaining to the concerned degrees of freedom and is not the simple superimposition of three distinct motions which are obtained with separate driving means that are distinct one from the other.

An additional purpose of the invention is to supply means for detecting the shift, the adjustment or the orientation of the mobile body relative to a static reference, so as to be able to determine immediately the relative spacing position that is adopted following the executed shift control.

SUMMARY OF THE INVENTION

In order to meet the above goals, the invention consists of an electro-mechanical converter with three degrees of freedom which includes:

a body (4) having a spherical surface, a structure (6) that is independent from the body but which is associated with the body (4) through means (5) which create a relative rotating shift along three axes, characterized in that it includes: electromagnetic means (M), which are inserted between the body (4) and the structure (6), that includes three independent inductors which are nevertheless connected among themselves and correspond to each degree of freedom, and act on a single armature through the application of a set of crossed inductive flows to this armature in order to trigger, on three independent axes (A) a relative, total and reversible rotation on an axis and partial and reversible displacement on the two other axes, between the spherical body (4) and the structure (6).

Various other characteristics stem from the description provided below as a reference to the attached drawings that indicate, as non-limiting examples, ways of implementing the present invention.

DETAILED DESCRIPTION OF THE PREFERRED EMBODIMENTS

Figure 1:
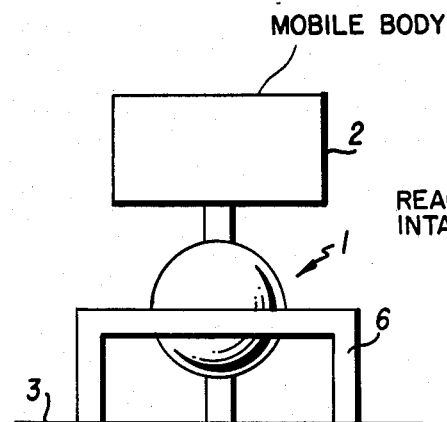
FIG. 1 is a schematic which shows a typical application of the present invention.

FIG. 1 schematically shows that the purpose of the present invention, represented as a whole by reference 1, is to permit the shifting, adjusting or orienting of any mobile body 2 relative to a static support 3.

Figure 2:
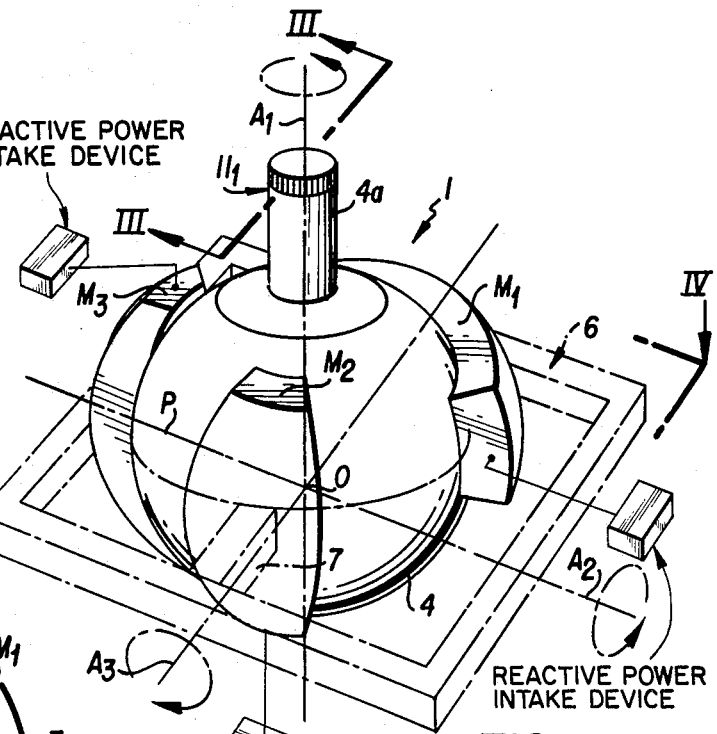
FIG. 2 is a schematic perspective which illustrates at a larger scale, the purpose of the present invention.

The device 1 is comprised of an electromagnetic converter with several clearance degrees and depicted, in its application according to FIG. 2, as being prone to authorizing a shift, an orientation or an adjustment according to three degrees of freedom which correspond to three orthogonal rotation axes. Those axes or degrees of freedom are represented by the references $A_1$, $A_2$, and $A_3$, which intersect at a common point O.

Electromagnetic converter 1 includes a body 4 that can be physically connected to the device 2 by any appropriate means, such as radial extension 4a which coincides with, preferably, the axis $A_1$.

The body 4 is mounted on the support 3 with means 5 that give it relative rotational shifting freedom, which is at least partial, on three axes. In the example illustrated by FIG. 3, the means 5 are comprised of a universal joint centered on the center 0 and arranged inside the body 4 which is comprised of a hollow body. The universal joint includes a knee joint which is comprised of a spherical part 5a that is attached to the body 4 by a radial strip 5b. The part 5a cooperates with a housing 5c, in two parts that can be assembled, which is planned at the end of a post 5d that rises from the support 3 crossing the hollow body 4 through an opening 4b.

The strip 5b and the post 5d coincide with the axis $A_1$ and therefore they assign a possible total and reversible rotation of the body 4 on that axis.

The means 5 might be achieved in a different way and, for instance, the universal joint might be directly formed by a housing inside the body 4 achieved in two parts that can be assembled in order to allow the assembly and disengagement of a spherical part carried by the post.

Figure 3:
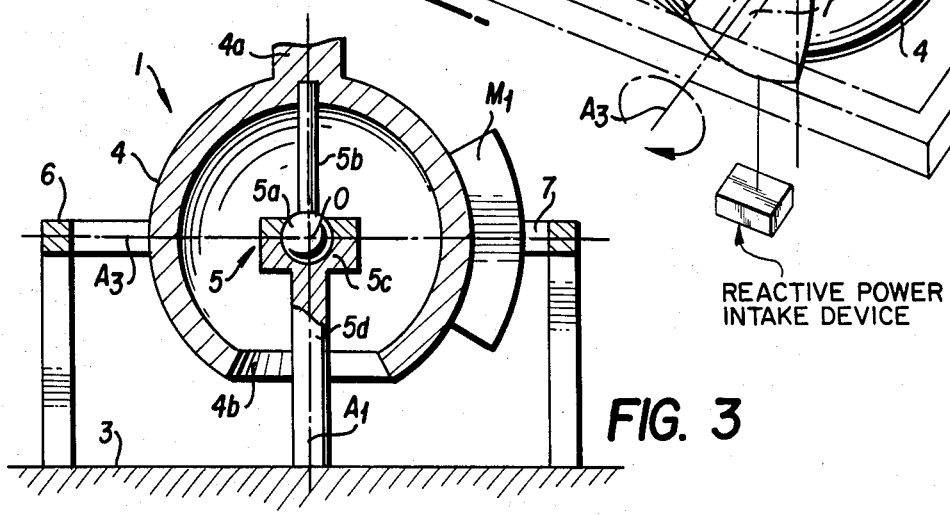
FIG. 3 is an enlarged cross-sectional view taken along the line III—III of FIG. 2.
Figure 3A:
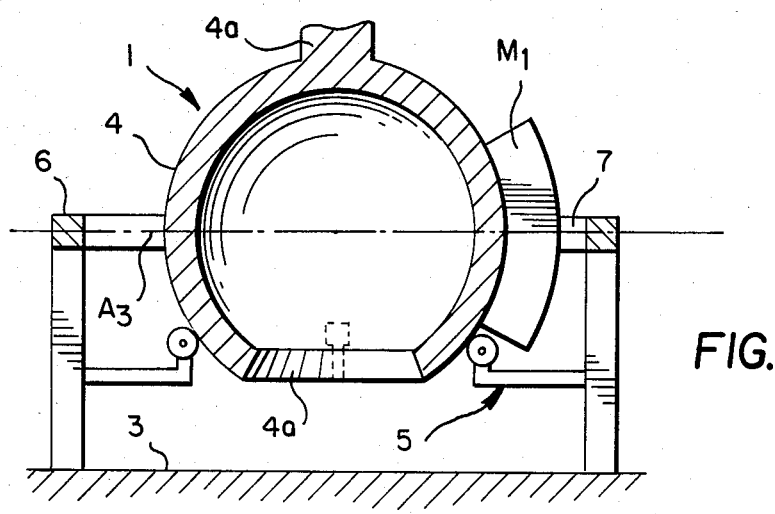
FIG. 3a is an enlarged cross-sectional view similar to FIG. 3 but depicting an alternative means for supporting the spherical body according to the invention.

Another way of achieving the means 5 would be to make it with four rollers carried by a cage which is attached to the support 3 and which cooperates with an outer spherical surface of the body 4, as shown in FIG. 3a.

The electromagnetic converter also includes electromagnetic means M or inductors which are designed to cooperate with the body 4. The means M are carried by a structure 6 which rises from the support 2.

The structure 6 can take on any particular shape which corresponds to the upheld application and it is illustrated in FIG. 2 only as a non-limiting example in the shape of a plane frame.

The means M are each assigned to a degree of freedom or to a rotation axis and as a result they carry indices 1, 2 and 3 which correspond to their counterpart rotation axes, respectively. The electromagnetic means $M_1$, $M_2$ and $M_3$ are preferably carried by the structure 6 so that their symmetrical plane corresponds with the diametrical plane P of the body 4, which is perpendicular to the axis A and crosses the point or center 0. As an example, the linkage can be set by appropriate ribs 7 considering the possible assembly and disengagement of means $M_1$, $M_2$ and $M_3$, as well as specific obligations which are inherent to their electromagnetic operation.

In the application example according to FIGS. 1 through 3, the means M are arranged outside of the body 4 which has a spherical outer surface that is centered on center 0.

The electromagnetic means $M_1$ is arranged so that its influence plane corresponds with the diametrical plane P whereas electromagnetic means $M_2$ and $M_3$ are arranged in two perpendicular planes so that the influence plane of each one, respectively, is perpendicular to the plane P.

More generally, inductors $M_1$, $M_2$ and $M_3$ are each arranged so that their respective lengthwise symmetrical planes are formed by the two axes other than that on which they are acting.

In a more general way still, inductors $M_1$, $M_2$ and $M_3$ can be arranged in three distinct planes which only have the center of the sphere in common.

Figure 4:
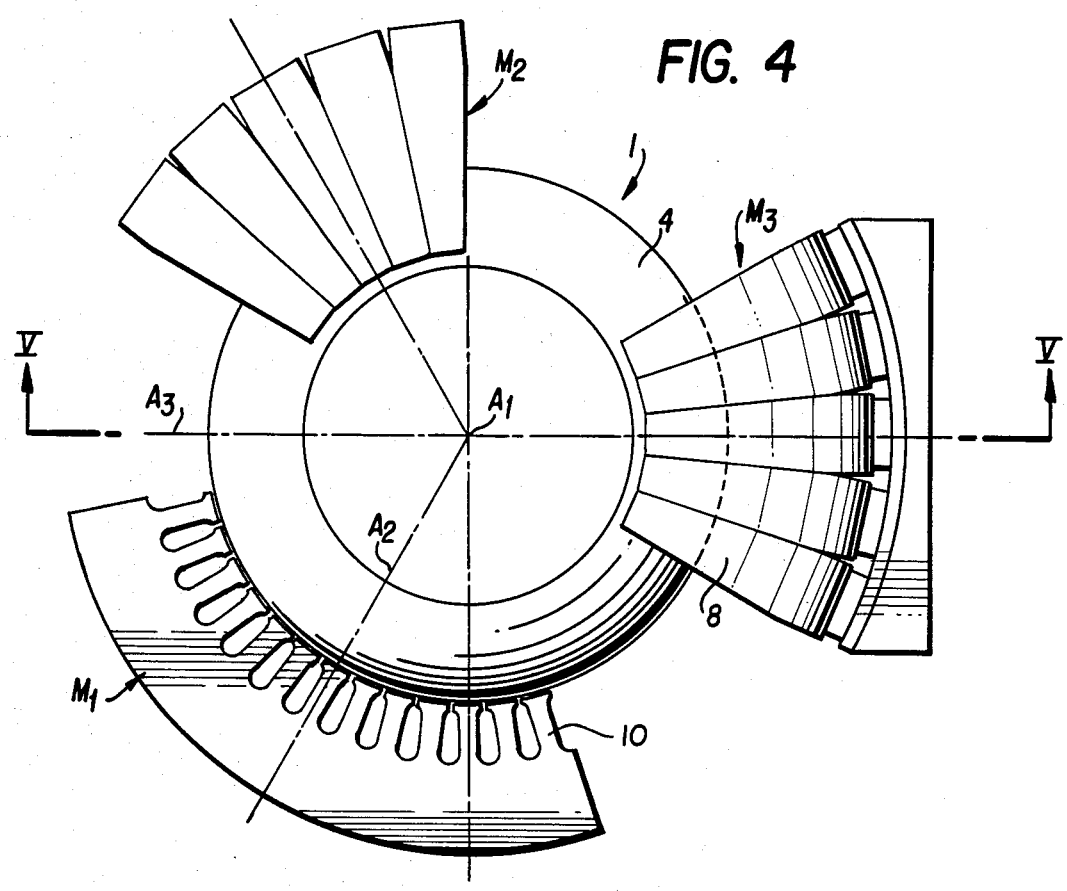
FIG. 4 is a cross-sectional view which was taken more or less along the line IV—IV of FIG. 2.
Figure 5:
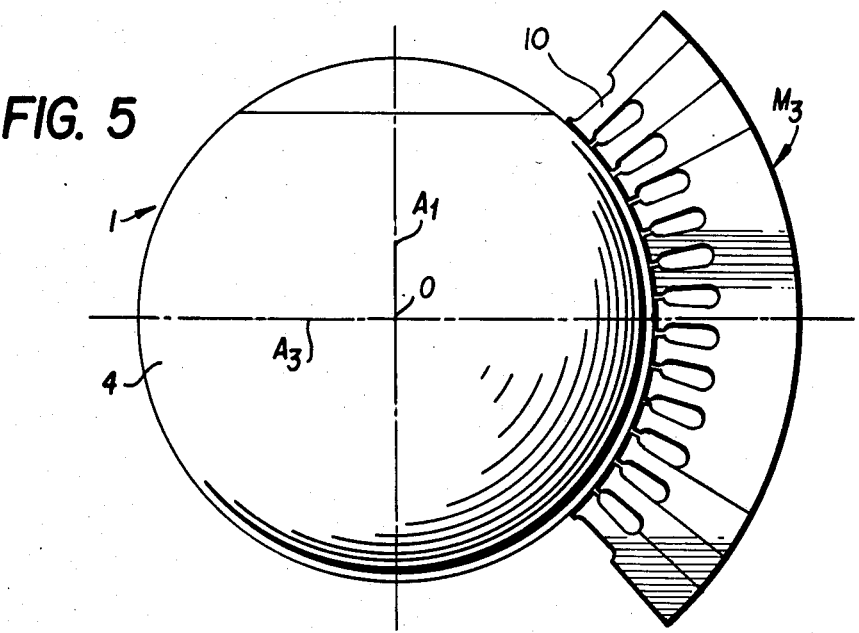
FIG. 5 is a cross-sectional view which was taken more or less along the line V—V of FIG. 4.

The electromagnetic means $M_1$, $M_2$ and $M_3$ are designed to create radial magnetic fields with tangential shifting, so as to trigger, each in its influence plane, a rotation in the body 4 on the axis that is perpendicular to such a plane. The means M are comprised of laminated masses 8 (FIGS. 4 and 5) that have been tooled so as to delineate, on their surface facing the spherical one of the body 4, teeth 10 between which spools are placed.

The assembly of these means $M_1$, $M_2$ and $M_3$ must be considered as being within the skill of one having ordinary skill in the art with regard to the selection of thicknesses and type of alloy of various plates which comprise individual plates of these laminated masses, the selection of insulating agents which separate the plates and the selection of the characteristics for the spools which are associated with them. The only requirement which must be maintained is the achievement of means $M_1$, $M_2$ and $M_3$ which display a surface with a portion of spherical surface, that is, in this case, concave, so as to be able to maintain a constant separation from the convex spherical surface of the body 4.

Figure 8:
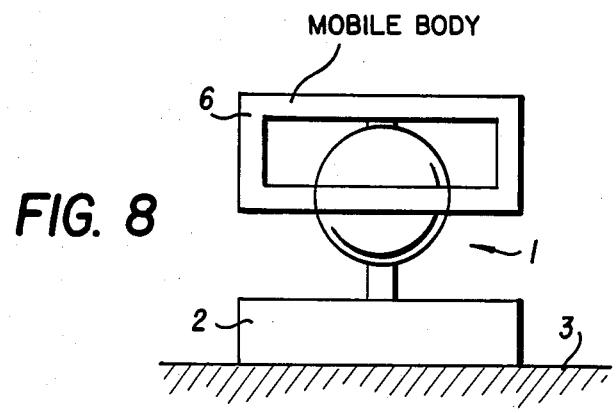
FIG. 8 is a schematic view that is analogous to FIG. 1 but depicts another typical application example.
Figure 9:
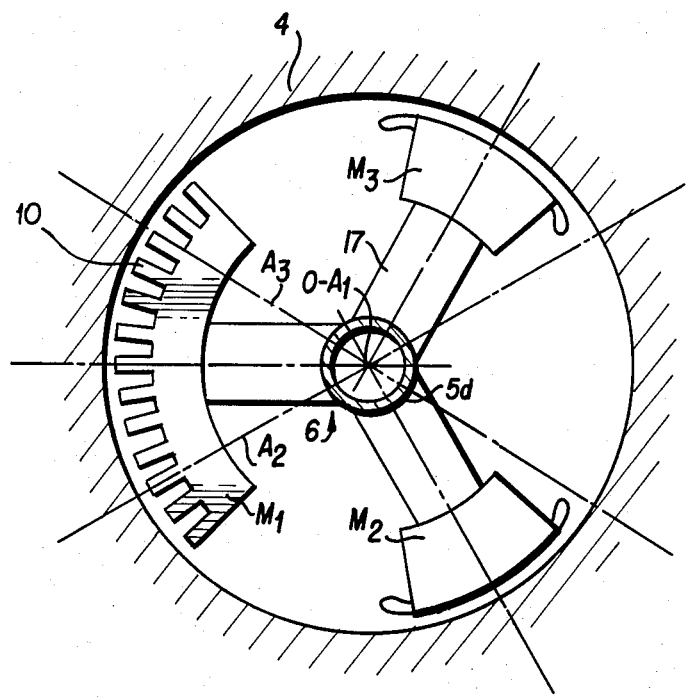
FIGS. 9 and 10 are schematic views which correspond to those diametrical sections that illustrate two different implementation variations of the purpose of the present invention.
Figure 10:
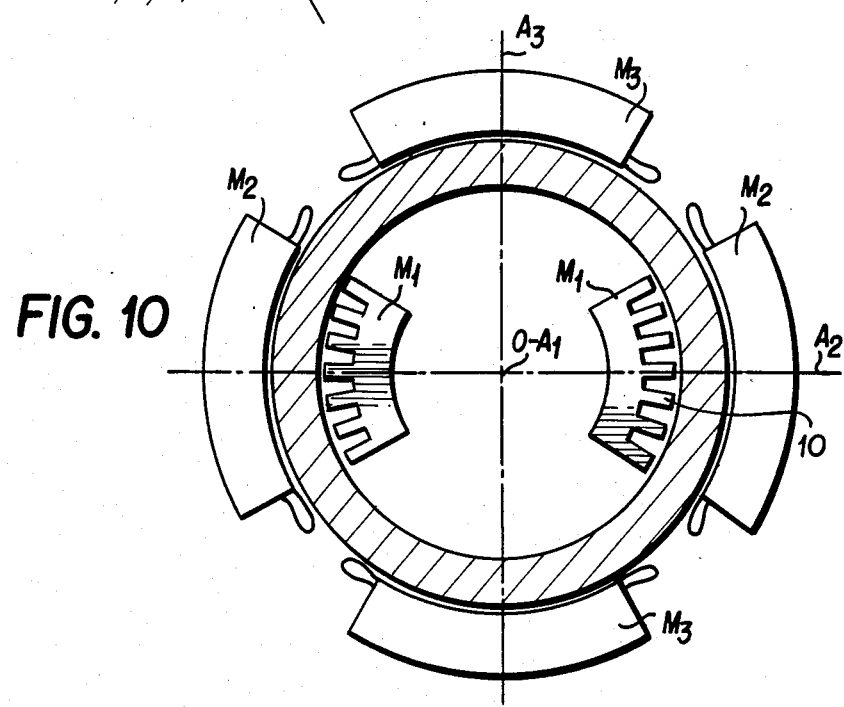

The inductors $M_1$, $M_2$ and $M_3$ can be formed from a single material entity, as is shown by the implementation modes in FIGS. 1 through 9, or from several separate entities as in the implementation mode of FIG. 10, for example.

The three inductors $M_1$, $M_2$, and $M_3$ therefore act independently on the single inductor, which is integral with the spherical body, and through a combination of three crossed electromagnetic flows which they apply on the armature, thus permit a shifting of the body 4 relative to themselves or in reverse of themselves relative to the body 4, according to the three degrees of freedom.

Indeed, the magnetic flows which are produced by the three inductors, even though they combine by acting on the same armature, each preserve the specificity of their activity and therefore the independence of their electromagnetic effects.

In order to be able to establish an electromagnetic coupling between means $M_1$, $M_2$ and $M_3$ and the spherical body 4, the latter is to be achieved in several different ways.

The body 4 can display a smooth outer surface and it can be made from a massive ferromagnetic mass, or at least partly of a ferromagnetic mass covered by a layer of conductive matter like copper or aluminum, or as another example, an a-magnetic substance which is integral with a conductive substance coating like copper or aluminum, for example.

The electromagnetic converter then represents an a-synchronous motive device with constant reluctance.

By associating a reactive power intake with the device, which is achieved for example with electric condensers (capacitors) that are electrically connected to the outputs of inductors $M_1$, $M_2$ and $M_3$, the device can operate as an a-synchronous generator during the slow-down phases in the motion of the spherical body.

The body 4 can also have notches (FIGS. 4a and 9a) which delineate plots that are planned so as to achieve in each direction, with the magnetic teeth 10 of the inductive means M, an electromagnetic Vernier effect.

The body 4 can also be made of a non-conductive ferromagnetic substance, or still, of a non-conductive ferromagnetic substance which is coated with a layer of conductive matter. The intervals between the plots can be taken up by magnets 18 and/or by poling spools 19.

Those coils can be supplied with a ring-sweep system.

The electromagnetic converter then constitutes a device with a synchronous coupling and variable reluctance under motive or generating operation.

A combination of those two techniques makes it possible to arrange a synchronized, a-synchronous converter.

This can be especially achieved by planning either a body (4) which is made of a conductive notched ferromagnetic material that can be coated with a conductive layer, or equally a body (4) which is made of non-conductive ferromagnetic material that is coated with a conductive layer, or the body (4) which is made of a non-conductive ferromagnetic material which includes short circuit windings.

The actuation of the inductors M is associated with variable intensity currents according to the desired shifting. A step-by-step control can thus be obtained in the event of assembly as a synchronous motive device.

Thus, in reference to FIG. 2, the actuation of the electromagnetic means $M_1$ makes it possible to encourage the spherical body 4 to turn with means 5 on the axis of degree of freedom $A_1$, in one direction or the other, and in a rotation that is lower than, equal to or greater than 360°.

The actuation of the means $M_2$ makes it possible to control the rotation of the spherical body with means 5 on axis $A_2$ with an angular magnitude that coresponds to the authorized shifting freedom, or with means 5, or with the general clearance which means $M_1$, $M_2$ and $M_3$ display. It is clear that actuation of the $M_2$ means can be established independently or in succession to that of the means $M_1$ when the body 4 must be driven into an independent shift, on each degree of freedom axis, into an ensuing motion which corresponds to the combined actions of at least two shifts on two degrees of freedom.

The actuation of means $M_3$ makes it possible to have the spherical body 4 turn with means 5 on the axis or degree of freedom $A_3$ with the same conditions to those corresponding to the engine $M_2$.

Thus, the electromagnetic converter, which is the subject of the present invention, comprised as described above, makes it possible, by being inserted between a support and any particular product or object, to control the position shifting, orienting or adjusting of that product by only having a single motive structure intervene of which the clearance is limited in relation to the traditional solutions which include as many activators as there are degrees of freedom.

Therefore, by utilizing the means of the present invention, it is possible to have the product or object 2 turn on the axis $A_1$ in a continuous rotation or a non-continuous rotation in one direction or the other and to adjust the position of that axis inside a cone, that is defined by a solid angle, which is determined by the shifting magnitude, which can be conferred under rotation on the axes $A_2$ and $A_3$.

According to a development of the present invention, a position sensor 11 may be included in the electromagnetic converter, which is integral to each degree of freedom.

Figure 6:
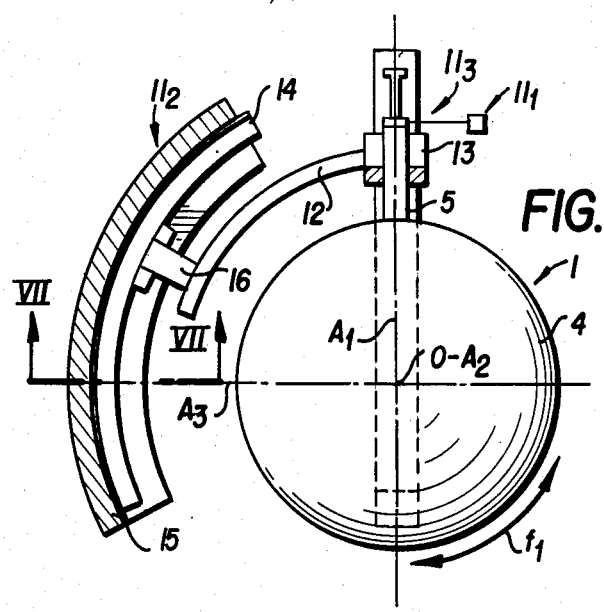
FIG. 6 shows in greater detail a constituent element disclosing a purpose of the invention.
Figure 7:
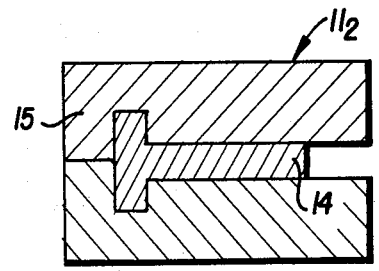
FIG. 7 is a cross-sectional view taken along line VII—VII of FIG. 6.

The position sensors $11_1$–$11_3$, which correspond to axes $A_2$ and $A_3$, respectively, can be of the kind that is depicted schematically in FIGS. 6 and 7. According to the latter, each sensor 11 includes an arm 12, which is mounted on the extension 4a by rotating ring 13. The arm 12 includes, at its opposite end, a strip 14 which can slide in a member 15 that takes up a static position on the structure 6 which corresponds to the influence plane of the means M, to which the sensor corresponds. The strip 14 is connected to the arm 12 by a pivot 16, on which the axis is directed toward the center 0. The strip 14 includes, on one of its constituent parts, slits of a set length which are designed to cooperate with a reading means, such as photo-transistors that are adapted on the slide 15. The slits are scaled so as to be able to determine both the magnitude and the direction of the shift from a neutral position, which corresponds to for instance, an alignment of the extension 4 with the vertical.

In reference to FIG. 6, the spherical body 4 is rotation free on axis A but any angular shift of this axis can therefore be sensed with the position sensors $11_2$–$11_3$. For example, if the electromagnetic means $M_2$ feed is ensured to the rotation of spherical body 4 on axis $A_2$, in one or the other direction of arrow $F_1$, the strip 14 moves inside the slide 15 and it supplies remotely through the cooperation of slits and reading means, appropriate data allowing to sense the magnitude or the new position reached by the spherical body 4.

The data which is generated by the sensors that correspond to axes $A_2$ and $A_3$, therefore make it possible to maintain precise knowledge of the spatial position of the extension 4a and, subsequently, of the product or object 2.

Knowledge of the orientation on axis $A_1$ is supplied by a position sensor $11_3$ which corresponds to axis $A_1$, that is comprised of a conventionally designed sensor, like a coded wheel, which is affixed on the extension 4a and associated to an optical or magnetic reader that is affixed for instance to one of the rings 13.

From what precedes, it is stated that, according to FIG. 1, the electromagnetic converter 1 is inserted between a static support 3 and a mobile product or object 2. The subject of the invention can also be implemented for a reverse arrangement which involves making the body 4 static and the structure 6 mobile when it conceived as an assembly platform or for adapting sets or various products, as shown in FIG. 8.

The operation described above functions in a similar way to produce a relative rotation between the spherical body 4 and the structure 6, as soon as anyone of means M is actuated.

In some applications, the electromagnetic converter of the invention can be used for devices where the clearance, depicted by the structure 6 and described in FIG. 2, can be prohibitory.

In such an instance, as depicted in FIG. 9, electromagnetic means $M_1$, $M_2$ and $M_3$ can be conceived so that the spherical surface, which they delineate, is external and not internal, so as to be able to cooperate with an inner spherical surface of the hollow body 4. The structure that carries electromagnetic means is displayed as an armature, for instance, with radiating arms 17 that extend from the post 5d. The radiating arms 17 and the post 5d are preferably tubular so as to ensure the conveyance and protection of feed conductors for the electromagnetic means M.

In this implementation example, the body 4 can be mobile in relation to the static armature 6, or the reverse.

FIG. 10 indicates that a mixed arrangement can also be upheld by having some of the means M attached to the inside of body 4 and other means outside the body 4, while all remain associated mechanically and electromagnetically. This might be the case, especially, when each means $M_1$, $M_2$ and $M_3$ is formed of two constituent elements which work as a pair in order to produce the shift of body 4 or of the structure 6 on an axis or degree of freedom.

Figure 4A:
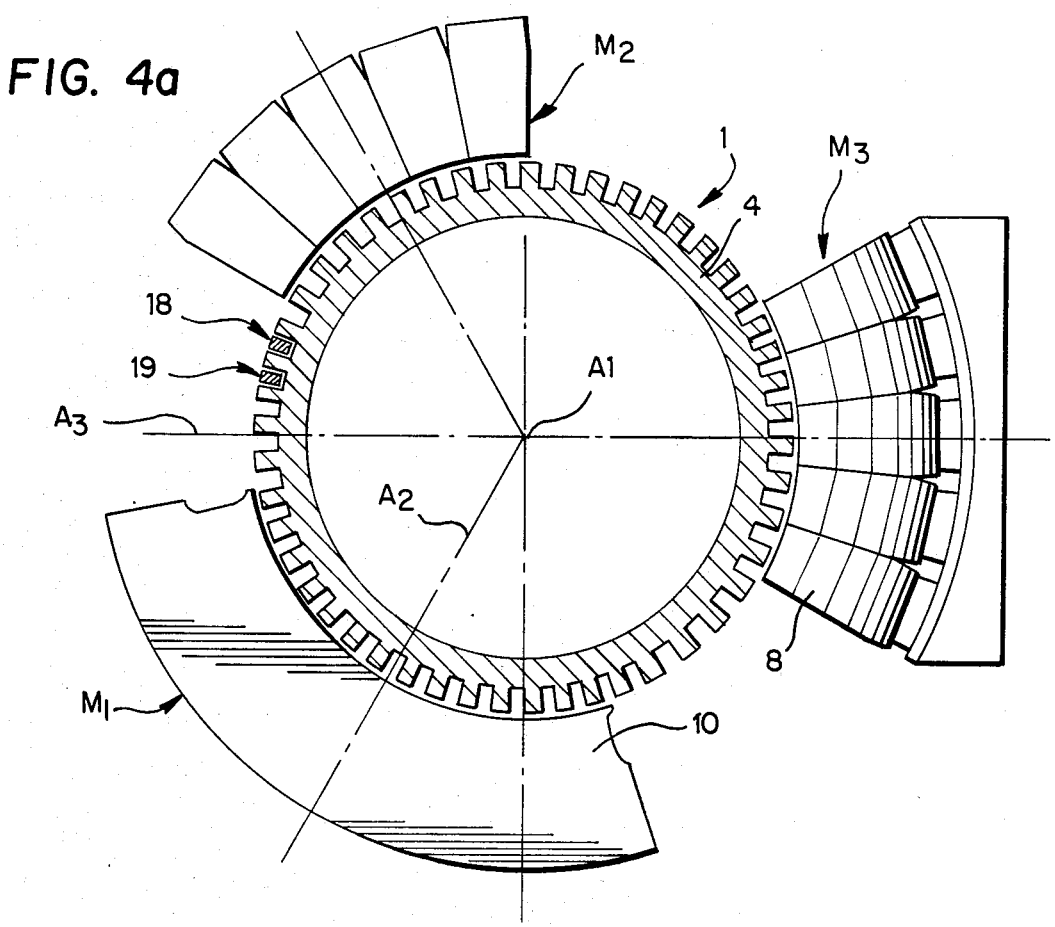
FIG. 4a is a cross-sectional view similar to FIG. 4 but depicting an externally notched spherical body according to the present invention.
Figure 9A:
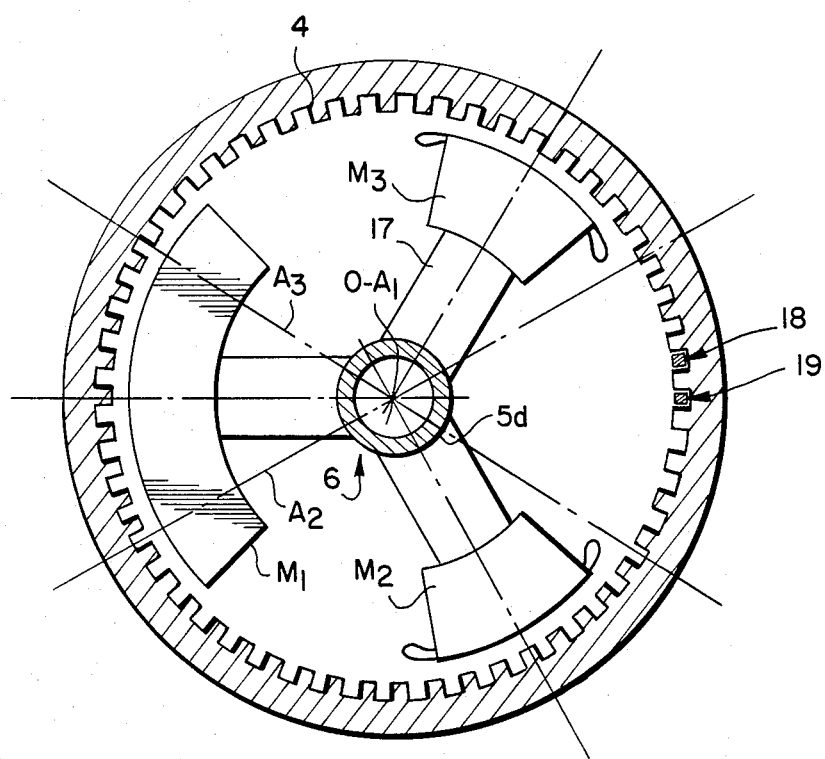
FIG. 9a is a schematic view similar to FIG. 9 but depicting an internally notched spherical body according to the present invention.

In this kind of configuration, when the outer surface of the mobile body (4) is smooth and its inner surface notched as shown in FIG. 9a (or the reverse as shown in FIG. 4a), the converter might achieve a synchronous motion on an axis and an a-synchronous one on the other two axes or reciprocally, according to the inner and outer distribution of the electromagnetic means $M_1$, $M_2$ and $M_3$.

One of the advantages of the invention is to concentrate the electromagnetic activities of three inductors on a single mobile structure, which makes it possible to eliminate, compared to current devices, a number of mechanical linkages, thus reducing friction and mechanical slack.

Another advantage of the invention rests in the fact that the inductors which are all associated with one another are mounted on only one support which makes it possible to substantially increase the compactness of the device.

We claim:

1. An electromagnetic converter having three degrees of freedom comprising:
   a body having a substantially spherical outer surface and three orthogonal rotation axes;
   a structure associated with and proximate to said body;
   electromagnetic means comprising three independent inductors spatially located from said body and substantially corresponding in shape to substantially spherical surfaces of said body, for generating a crossed magnetic flow acting upon said body to cause a total and reversible relative rotation between the body and the structure on one of said three orthogonal rotation axes and a partial and reversible relative rotation between the body and the structure on a second and third ones of said three orthogonal rotation axes; and
   connecting means for connecting said body with a static support.

2. The electromagnetic converter of claim 1, wherein the electromagnetic means comprises a unitary inductor.

3. The electromagnetic converter of claim 1, wherein the electromagnetic means comprises three independent inductors.

4. The electromagnetic converter of claim 1, wherein said body is mobile and said peripherally surrounding structure is static.

5. The electromagnetic converter of claim 1, wherein said body is static and said peripherally surrounding structure is mobile.

6. The electromagnetic conveter of claim 1, wherein said electromagnetic means are spatially located outside of said body and substantially correspond in shape to said spherical outer surface of said body, whereby said electromagnetic means cooperate with said spherical outer surface.

7. The electromagnetic converter of claim 1, wherein said body is hollow and a substantially spherical inner surface is created as an inside surface of said hollow body and said electromagnetic means are spatially located inside of said hollow body and substantially correspond in shape to said inner spherical surface of said body and cooperate with said inner spherical surface of said body.

8. The electromagnetic converter of claim 1, wherein said body is hollow and a substantially spherical inner surface is created as an inside surface of said hollow body and said electromagnetic means are located inside of said hollow body and outside of said hollow body and each of said electromagnetic means is spatially located from said inner spherical surface and said outer spherical surface, respectively.

9. The electromagnetic converter of claim 1, wherein said spherical outer surface of said body contains a conductive substance to provide an a-synchronous electromagnetic coupling function when said electromagnetic means act upon said body.

10. The electromagnetic converter of claim 9, wherein said conductive substance is selected from the group consisting of copper and aluminum.

11. The electromagnetic converter of claim 1, wherein said electromagnetic means further comprise an electric terminal thereon, which is electrically connected to a reactive power intake device to permit said electromagnetic means to function as an a-synchronous generator.

12. The electromagnetic converter of claim 11, wherein said reactive power intake comprises capacitors.

13. The electromagnetic converter of claim 1, wherein said connecting means comprises a universal joint located inside of said body.

14. The electromagnetic converter of claim 1, wherein said connecting means comprises a cage having a plurality of rollers thereon, the rollers cooperating with said outer spherical surface of said body and the cage is attached to said static support.

15. The electromagnetic converter of claim 1, wherein said body further comprises a plurality of notches and permanent magnets cooperating therewith thereby permitting magnetic poling and achieving synchronous electromagnetic coupling effect.

16. The electromagnetic converter of claim 15, wherein windings are used in addition to said permanent magnets.

17. The electromagnetic converter of claim 1, wherein said body further comprises a plurality of notches and windings cooperating therewith thereby permitting magnetic poling and achieving synchronous electromagnetic coupling effect.

18. The electromagnetic converter of claim 1, wherein said body is made from a conductive ferromagnetic material containing a plurality of notches permitting the electromagnetic converter to function as a synchronized a-synchronous converter.

19. The electromagnetic converter of claim 1, wherein said body is hollow and said spherical outer surface is smooth and a substantially spherical inner surface is created, said inner surface being notched to permit synchronous coupling upon a first one of said three orthogonal rotation axes and an a-synchronous coupling on a second and third of said three orthogonal rotation axes.

20. The electromagnetic converter of claim 1, wherein said body is hollow and said spherical outer surface has a plurality of notches thereon, and a substantially spherical inner surface is created, said inner surface being smooth, to permit a synchronous coupling upon a first one of said three orthogonal rotation axes and an a-synchronous coupling on a second and third of said three orthogonal rotation axes.

21. The electromagnetic converter of claim 1, wherein a plurality of position sensors cooperate with each of said three orthogonal rotation axes to determine a precise position of said body.

22. The electromagnetic converter of claim 2, wherein said inductor comprises a plurality of laminates.

23. The electromagnetic converter of claim 3, wherein said inductor comprises a plurality of laminates.

* * * * *